US009057010B2

(12) United States Patent
Rached

(10) Patent No.: US 9,057,010 B2
(45) Date of Patent: *Jun. 16, 2015

(54) TERNARY HEAT-TRANSFER FLUIDS COMPRISING DIFLUOROMETHANE, PENTAFLUOROETHANE AND TETRAFLUOROPROPENE

(75) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 27 days.

This patent is subject to a terminal disclaimer.

(21) Appl. No.: 13/696,870

(22) PCT Filed: Apr. 18, 2011

(86) PCT No.: PCT/FR2011/050882
§ 371 (c)(1),
(2), (4) Date: Nov. 8, 2012

(87) PCT Pub. No.: WO2011/141655
PCT Pub. Date: Nov. 17, 2011

(65) Prior Publication Data
US 2013/0055738 A1    Mar. 7, 2013

(30) Foreign Application Priority Data

May 11, 2010  (FR) ...................... 10 53671

(51) Int. Cl.
*C09K 5/04* (2006.01)
(52) U.S. Cl.
CPC ........... *C09K 5/045* (2013.01); *C09K 2205/126* (2013.01); *C09K 2205/22* (2013.01)
(58) Field of Classification Search
CPC ............. C09K 5/045; C09K 2205/126; C09K 2205/122; F25B 1/00
USPC ................. 252/67, 68; 62/467, 468
See application file for complete search history.

(56) References Cited

U.S. PATENT DOCUMENTS

| | | | |
|---|---|---|---|
| 2,438,120 A | 3/1948 | Freygang | |
| 2,834,748 A | 5/1958 | Bailey et al. | |
| 2,846,458 A | 8/1958 | Haluska et al. | |
| 2,917,480 A | 12/1959 | Bailey et al. | |
| 5,399,631 A | 3/1995 | Egawa et al. | |
| 5,497,631 A | 3/1996 | Lorentzen et al. | |
| 5,688,432 A | 11/1997 | Pearson | |
| 5,744,052 A | 4/1998 | Bivens | |
| 6,454,960 B1 | 9/2002 | Sunaga et al. | |
| 6,589,355 B1 | 7/2003 | Thomas et al. | |
| 6,655,160 B2 | 12/2003 | Roberts | |
| 7,914,696 B2 | 3/2011 | Low et al. | |
| 8,070,977 B2* | 12/2011 | Rached | 252/67 |
| 8,075,798 B2* | 12/2011 | Rached | 252/67 |
| 8,142,680 B2* | 3/2012 | Rached | 252/67 |
| 8,246,850 B2* | 8/2012 | Rached | 252/67 |
| 8,496,845 B2* | 7/2013 | Tsuchiya et al. | 252/67 |
| 2006/0243944 A1 | 11/2006 | Minor et al. | |
| 2006/0269484 A1 | 11/2006 | Knopeck et al. | |
| 2007/0108403 A1 | 5/2007 | Sievert et al. | |
| 2008/0230738 A1 | 9/2008 | Minor et al. | |
| 2009/0158771 A1 | 6/2009 | Low et al. | |
| 2009/0249864 A1 | 10/2009 | Minor et al. | |
| 2009/0250650 A1* | 10/2009 | Minor et al. | 252/2 |
| 2009/0278072 A1 | 11/2009 | Minor et al. | |
| 2009/0305876 A1 | 12/2009 | Singh et al. | |
| 2010/0044619 A1 | 2/2010 | Hulse et al. | |
| 2010/0044620 A1* | 2/2010 | Rached | 252/67 |
| 2010/0122545 A1 | 5/2010 | Minor et al. | |
| 2011/0079042 A1* | 4/2011 | Yamashita et al. | 62/498 |
| 2011/0095224 A1* | 4/2011 | Rached | 252/67 |
| 2011/0108756 A1 | 5/2011 | Tsuchiya et al. | |
| 2011/0162410 A1* | 7/2011 | Low | 62/532 |
| 2011/0173997 A1 | 7/2011 | Low et al. | |
| 2011/0186772 A1* | 8/2011 | Rached | 252/67 |
| 2011/0219792 A1* | 9/2011 | Rached | 62/79 |
| 2011/0219815 A1* | 9/2011 | Yana Motta et al. | 62/498 |
| 2011/0240254 A1* | 10/2011 | Rached | 165/51 |
| 2011/0284181 A1* | 11/2011 | Rached | 165/51 |
| 2012/0049104 A1* | 3/2012 | Rached | 252/67 |
| 2012/0056123 A1* | 3/2012 | Rached | 252/67 |
| 2012/0144857 A1* | 6/2012 | Rached | 62/502 |
| 2012/0151959 A1* | 6/2012 | Rached | 62/468 |
| 2012/0153213 A1* | 6/2012 | Rached | 252/67 |
| 2012/0159982 A1* | 6/2012 | Rached | 62/468 |
| 2012/0161064 A1* | 6/2012 | Rached | 252/68 |

(Continued)

FOREIGN PATENT DOCUMENTS

| | | | |
|---|---|---|---|
| WO | WO 2004/037913 A2 | 5/2004 | |
| WO | WO 2004/037913 A3 | 5/2004 | |

(Continued)

OTHER PUBLICATIONS

Third Party Observation mailed on May 26, 2014, by the European Patent Office in corresponding European Patent Application No. 11731420.3. (4 pages).
Takizawa, K., et al., "Flammability Assessment of CH2=CFCF3: Comparison with Fluoroalkenes and Fluoroalkanes", Journal of Hazardous Materials, vol. 172, No. 2-3, Aug. 18, 2009, pp. 1329-1338, XP026719989, Elsevier B.V.
"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.
Translated Excerpt from Official Action issued Mar. 3, 2015 in corresponding Japanese Patent Application No. 2013-0509593, Japan Patent Office, 1 page.

*Primary Examiner* — Douglas McGinty
(74) *Attorney, Agent, or Firm* — Buchanan Ingersoll & Rooney P.C.

(57) ABSTRACT

The invention relates to a ternary composition comprising: from 5 to 50% of difluoromethane;—from 2 to 20% of pentafluoroethane; and—from 30 to 90% of tetrafluoropropeae. The tetrafluoropropeae may be 1,3,3,3-tetrafluoropropene or 2,3,3,3-tetrafluoropropene. This composition can be used as a heat-transfer fluid in vapor compression circuit.

14 Claims, No Drawings

(56) References Cited

U.S. PATENT DOCUMENTS

| | | | |
|---|---|---|---|
| 2012/0167615 A1* | 7/2012 | Rached | 62/468 |
| 2012/0255316 A1* | 10/2012 | Andre et al. | 62/98 |
| 2013/0055733 A1* | 3/2013 | Rached | 62/77 |
| 2013/0055739 A1* | 3/2013 | Rached | 62/114 |
| 2013/0061613 A1 | 3/2013 | Rached | |
| 2013/0096218 A1* | 4/2013 | Rached et al. | 521/170 |
| 2013/0145778 A1 | 6/2013 | Motta et al. | |
| 2013/0193369 A1* | 8/2013 | Low | 252/68 |
| 2013/0255284 A1* | 10/2013 | Rached | 62/77 |
| 2014/0075969 A1 | 3/2014 | Guerin et al. | |
| 2014/0137578 A1* | 5/2014 | Yana Motta et al. | 62/77 |
| 2014/0223927 A1* | 8/2014 | Pottker et al. | 62/77 |

FOREIGN PATENT DOCUMENTS

| | | | |
|---|---|---|---|
| WO | WO 2005/105947 A2 | | 11/2005 |
| WO | WO 2005/105947 A3 | | 11/2005 |
| WO | WO 2007/053697 A2 | | 5/2007 |
| WO | WO 2007/053697 A3 | | 5/2007 |
| WO | WO 2007/126414 A2 | | 11/2007 |
| WO | WO 2007/126414 A3 | | 11/2007 |
| WO | WO 2009/047542 A1 | | 4/2009 |
| WO | WO2009/154149 A1 | | 12/2009 |
| WO | WO 2009151669 A1 | * | 12/2009 |
| WO | WO 2010002014 A1 | * | 1/2010 |
| WO | 2010/059677 A2 | | 5/2010 |
| WO | WO 2010064005 A1 | * | 6/2010 |
| WO | WO 2010129461 A2 | * | 11/2010 |
| WO | WO 2010129920 A1 | * | 11/2010 |
| WO | WO 2011/073934 A1 | | 6/2011 |
| WO | WO 2011/107698 A2 | | 9/2011 |
| WO | WO 2011/107698 A3 | | 9/2011 |
| WO | WO 2011/141654 A2 | | 11/2011 |
| WO | WO 2011/141654 A3 | | 11/2011 |
| WO | WO 2011/141656 A2 | | 11/2011 |
| WO | WO 2011/141656 A3 | | 11/2011 |
| WO | WO 2014/081539 A1 | * | 5/2014 |

* cited by examiner

TERNARY HEAT-TRANSFER FLUIDS COMPRISING DIFLUOROMETHANE, PENTAFLUOROETHANE AND TETRAFLUOROPROPENE

FIELD OF THE INVENTION

The present invention relates to transfer fluids based on difluoromethane, pentafluoroethane and tetrafluoropropene, which have high performance and low GWP, and are therefore suitable for replacing the usual coolants.

TECHNICAL BACKGROUND

Fluids based fluorocarbon compounds are widely used in vapor-compression heat transfer systems, especially airconditioning, heat pump, refrigeration or freezing devices. The common features of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat transfer fluid (which may be a pure compound or mixture of compounds) is dictated firstly by the thermodynamic properties of the fluid, and secondly by additional constraints. Thus, a particularly important criterion is the impact of the fluid under consideration on the environment. In particular, chlorinated compounds (chlorofluorocarbons and hydrochlorofluorocarbons) have the drawback of damaging the ozone layer. Non-chlorinated compounds such as hydrofluorocarbons, fluoroethers and fluoroolefins are therefore now generally preferred to chlorinated compounds.

Heat transfer fluids that are currently used are HFC-134a, R404a (ternary mixture of 52% HFC-143a, 44% HFC-125 and 4% of HFC-134a) and R407c (ternary mixture of 52% HFC-134a, 25% HFC-125 and 23% HFC-32).

It is, however, necessary to develop other heat transfer fluids that have a lower global warming potential (GWP) than that of the above fluids, and with equivalent and preferably improved performance qualities.

Document U.S. 2009/0250650 describes various fluoroolefin-based compositions and their use as heat transfer fluids. In particular, the document describes the mixture consisting of HFC-32, HFC-125 and HFO-1234ze and also the mixture consisting of HFC-32, HFC-125 and HFO-1234yf. The compositions indicated as being preferred are the following:
  23% of HFC-32, 25% HFC-125 and 52% of HFO-1234ze;
  30% of HFC-32, 50% HFC-125 and 20% of HFO-1234ze;
  40% of HFC-32, 50% HFC-125 and 10% of HFO-1234yf;
  23% of HFC-32, 25% HFC-125 and 52% of HFO-1234yf;
  15% of HFC-32, 45% HFC-125 and 40% of HFO-1234yf; and
  10% of HFC-32, 60% HFC-125 and 30% of HFO-1234yf.

Document WO 2010/002014 describes a non-flammable coolant based on HFC-32, HFC-125 and HFO-1234yf. Several compositions are disclosed and especially comprising 15% HFC-32, 25% HFC-125 and 60% of HFO-1234yf.

However, there is still a need to develop other heat transfer fluids with a relatively low GWP and that have better energy performance qualities than the heat transfer fluid of the prior art.

SUMMARY OF THE INVENTION

The invention relates firstly to a ternary composition comprising:
  from 5 to 50% of difluoromethane;
  from 2 to 20% of pentafluoroethane; and
  from 30 to 90% of tetrafluoropropene.

According to one embodiment, the tetrafluoropropene is 1,3,3,3-tetrafluoropropene.

According to another embodiment, the tetrafluoropropene is 2,3,3,3-tetrafluoropropene.

According to one embodiment, the composition comprises:
  from 15 to 35% of difluoromethane;
  from 5 to 20% of pentafluoroethane, and
  from 45 to 80% of 2,3,3,3-tetrafluoropropene; and preferably:
  from 18 to 25% of difluoromethane;
  from 8 to 20% of pentafluoroethane, and
  from 55 to 74% of 2,3,3,3-tetrafluoropropene;

According to one embodiment, the composition comprises:
  from 15 to 50% of difluoromethane;
  from 5 to 20% of pentafluoroethane, and
  from 30 to 80% of 1,3,3,3-tetrafluoropropene; and preferably:
  from 30 to 40% of difluoromethane;
  from 8 to 20% of pentafluoroethane, and
  from 40 to 62% of 1,3,3,3-tetrafluoropropene.

According to one embodiment, the composition comprises:
  from 5 to 30% of difluoromethane;
  from 5 to 20% of pentafluoroethane, and
  from 50 to 90% of 1,3,3,3-tetrafluoropropene; and preferably:
  from 5 to 20% of difluoromethane;
  from 5 to 20% of pentafluoroethane, and
  from 60 to 90% of 1,3,3,3-tetrafluoropropene.

According to one embodiment, the composition comprises:
  from 20 to 40% of difluoromethane;
  from 5 to 20% of pentafluoroethane, and
  from 40 to 75% of 1,3,3,3-tetrafluoropropene; and preferably:
  from 25 to 40% of difluoromethane;
  from 5 to 20% of pentafluoroethane, and
  from 40 to 70% of 1,3,3,3-tetrafluoropropene.

The invention also relates to the use of the abovementioned ternary composition as a heat transfer fluid in vapor compression circuit.

The invention also relates to a heat transfer composition comprising the abovementioned ternary composition as a heat transfer fluid, and one or more additives chosen from lubricants, stabilizers, surfactants, tracer agents, fluorescers, odorants and solubilizers, and mixtures thereof.

The invention also relates to a heat transfer installation comprising a vapor compression circuit containing the abovementioned ternary composition as heat transfer fluid, or containing an abovementioned heat transfer composition.

According to one embodiment, the installation is chosen from mobile or stationary heat-pump heating, airconditioning, refrigeration and freezing installations.

The invention also relates to a process for heating or cooling a fluid or a body using a vapor compression circuit containing a heat transfer fluid, said process successively compressing of the heat transfer fluid, condensation of the heat fluid and depressurization of the heat transfer fluid, and the heat transfer fluid being the abovementioned ternary composition.

According to one embodiment of the heating or cooling process, this process is a process for cooling a fluid or a body, in which the temperature or the cooled fluid or body is from −40° C. to −10° C., preferably from −35° C. to −25° C. and more particularly preferably from −30° C. to −20° C., and in which the heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 15% to 50% of difluoromethane, from 5% to 20% of pentafluoroethane and from 30% to 80% of 1,3,3,3-tetrafluoropropene, preferably from 30% to 40% of difluoromethane, from 8% to 20% of pentafluoroethane and 40% to 62% of 1,3,3,3-tetrafluoropropene.

According to another embodiment of the heating or cooling process, this process is a process for cooling a fluid or a body, in which the temperature of the cooled fluid or body is from −15° C. to 15° C., preferably from −10° C. to 10° C. and more particularly preferably from −5° C. to 5° C., and in which the heat transfer fluid comprises:

from 15 to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

According to another embodiment of the heating or cooling process, this process is a process for heating a fluid or a body, in which the temperature of the heated fluid or body is from 30° C. to 80° C., preferably from 35° C. to 55° C. and more particularly preferably from 40° C. to 50° C., and in which the heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

The invention also relates to a process for reducing the environmental impact of a heat transfer installation comprising a vapor compression circuit containing an initial heat transfer fluid, said process comprising a step of replacing the initial heat transfer fluid in the vapor compression circuit with a final transfer fluid, the final transfer fluid having a lower GWP than the initial heat transfer fluid, in which the final heat transfer fluid is the abovementioned ternary composition.

According to one embodiment of this method for reducing the environmental impact, the heat transfer fluid is a ternary mixture of 52% of 1,1,1-trifluoroethane, 44% of pentafluoroethane and 4% 1,1,1,2-tetrafluoroethane or a ternary mixture of 52% of 1,1,1,2-tetrafluoroethane, 25% of pentafluoroethane and 23% of difluoromethane, and the final heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 15% to 50% of difluoromethane, from 5% to 20% of pentafluoroethane and from 30% to 80% of 1,3,3,3-tetrafluoropropene, preferably from 30% to 40% of difluoromethane, from 8% to 20% of pentafluoroethane and from 40% to 62% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

According to another embodiment of this process for reducing the environmental impact, the initial heat transfer fluid is 1,1,1,2-tetrafluoroethane and the final heat transfer fluid comprises:

from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene.

The present invention makes it possible to overcome the drawbacks of the prior art. It more particularly provides heat transfer fluids with a relatively low GWP, which have better energy performance qualities than the known heat transfer fluids.

This is accomplished by means of ternary mixtures comprising HFC-32, HFC-125 and tetrafluoropropene in the proportions indicated above.

According to certain particular embodiments, the invention also has one or preferably several of the advantageous features listed below.

The heat transfer fluid of the invention have a performance coefficient higher than the reference coolants R404a, R407c and/or HFC-134, in the same type of applications.

The capacity of the heat transfer fluids of the invention is greater than or equal to that of the reference coolants, in the same type of applications. Correlatively, the invention makes it possible to reduces the GWP of existing systems comprising one of the above reference coolants, and to do so while improving to a large extent the performance qualities of these systems, by replacing the reference coolants with the heat transfer fluids of the invention.

The heat transfer fluid of the invention have a performance coefficient greater than that of the ternary mixtures of HFC-32, HFC-125 and HFO-1234ze or HFO-1234yf which are described in documents U.S. 2009/0250650 and WO 2010/002014.

Certain heat transfer fluids according to the invention make it possible to obtain a compressor outlet temperature which is lower than that obtained with the heat transfer fluids of the prior art.

According to the invention, the global warming potential (GWP) is defined relative to carbon dioxide and relative to a duration of 100 years, according to the method indicated in "The scientific assessment of ozone depletion, 2002, report of the World Meteorological Association's Global Ozone Research and Monitoring Project".

DESCRIPTION OF EMBODIMENTS OF THE INVENTION

The invention is now described in greater detail and in a nonlimited manner in the description that follows.

The term "heat transfer compound" or, respectively, "heat transfer fluid" (or coolant fluid) means a compound or, respectively, a fluid which is capable of absorbing heat by evaporating at a low temperature and low pressure and of expelling heat by condensing at high temperature and high pressure, in a vapor compression circuit. In general, a heat transfer fluid may comprise only one, two, three or more than three heat transfer compounds.

The term "heat transfer composition" means a composition comprising a heat transfer fluid and optionally one or more additives that are not heat transfer compounds for the envisioned application.

The heat transfer process according to the invention is based on the use of an installation comprising a vapor compression circuit containing a heat transfer fluid. The heat transfer process may be a process for heating or cooling of a fluid or a body.

The vapor compression circuit containing a heat transfer fluid comprises at least one evaporator, a compressor, a condenser and an pressure reducer, and also lines for transporting heat transfer fluid between these elements. The evaporator and the condenser comprises a heat exchanger that allows heat exchange between the heat transfer fluid and another fluid or body.

As compressor, use may be made especially of a centrifugal compressor containing one or more stages or a centrifugal minicompressor. Rotary, piston or screw compressors may also be used. The compressor can be driven by an electric motor or by a gas turbine (for example fed with a vehicle's exhaust gases, for mobile applications) or by gearing.

The installation may comprise a turbine for generating electricity (Rankine cycle).

The installation may also optionally comprise at least one heat transfer fluid circuit use for transmitting heat (with or without a change of state) between the heat transfer fluid circuit and the fluid or body to be heated or cooled.

The installation may also optionally comprise two (or more) vapor compression circuits, containing identical or different heat transfer fluids. For example, the vapor compression circuits may be coupled together.

The vapor compression circuit operates according to a standard vapor compression cycle. The cycle comprises change of state of the heat transfer fluid from a liquid phase (or two-phase liquid/vapor) to a vapor phase at a relatively low pressure, and then compression of the fluid in the vapor phase to a relatively high pressure, change of state condensation) of the heat transfer fluid from the vapor phase to the liquid phase at a relatively high pressure, and reduction of the pressure to recommence the cycle.

In the case of a cooling process, heat derived from the fluid or body that is cooled (directly or indirectly, via a heat transfer fluid) is absorbed by the heat transfer fluid, during its evaporation, at a relatively low temperature relative to the environment. The cooling processes comprise air-conditioning processes (with mobile installations, for example in vehicles, or stationary installations) and refrigeration and freezing or cryogenic processes.

In the case of a heating process, heat is transferred (directly or indirectly, via a heat transfer fluid) from the heat transfer fluid, during its condensation, to the fluid or body that is heated, at a relatively high temperature relative to the environment. The installation for performing the heat transfer is known in this case as a "heat pump".

It is possible to use any type of heat exchanger for the implementation of the heat transfer fluids according to the invention, and especially co-current heat exchangers.

However, according to one preferred embodiment, the invention envisages that the cooling and heating processes, and the corresponding installations, comprise a counter-current heat exchanger, either at the condenser or at the evaporator. Specifically, the heat transfer fluids according to the invention are particularly efficient with counter-current heat exchangers. Preferably, both the evaporator and the condenser comprise a counter-current heat exchanger.

According to the invention, the term "counter-current heat exchanger" means a heat exchanger in which heat is exchanged between a first fluid and a second fluid, the first fluid at the exchanger inlet exchanging heat with the second fluid at the exchanger outlet, and the first fluid at the exchanger outlet exchanging heat with the second fluid at the exchanger inlet.

For example, counter-current heat exchangers comprise devices in which the stream of the first fluid and the stream of the second fluid are in opposite or virtually opposite directions. Exchangers operating in cross-current mode with a counter-current tendency are also included among the counter-current heat exchangers for the purposes of the present application.

The meaning of the various abbreviations used to denote the various chemical compounds mentioned in the application is as follows:
HFC-134a: 1,1,1,2-tetrafluoroethane;
HFC-125: pentafluoroethane;
HFC-32: difluoromethane;
HFO-1234ze: 1,3,3,3-tetrafluoropropene;
HFO-1234yf: 2,3,3,3-tetrafluoropropene.

The heat transfer fluid used in the invention are the following ternary mixtures:
1) HFC-32, HFC-125 et HFO-1234ze; and
2) HFC-32, HFC-125 et HFO-1234yf.

The term "ternary mixture" means a composition consisting essentially of the three mentioned compounds, i.e. in which the three mentioned compounds represent at least 99% (preferably at least 99.5% or even at least 99.9%) of the composition.

Unless otherwise mentioned, throughout the application, the indicated proportions of compounds are given as mass percentages.

HFO-1234ze may be in cis or trans form (preferably trans) or may be a mixture of these two forms.

In the above compositions, the HFC-32 is present in an amount of from 5% to 50%, HFC-125 is present in an amount of from 2% to 20% HFO-1234yf and HFO-1234ze is present in an amount of from 30% to 90%.

For use in low-temperature refrigeration processes, i.e. those in which the temperatures of the cooled fluid or body is from −40° C. to −10° C., preferably from −35° C. to −25° C. and more particularly preferably from −30° C. to −20° C. (ideally about −25° C.), it has been found that the compositions that are the most efficient for replacing R404a are the following:
    for composition 1): from 15% to 50% HFC-32, from 5% to 20% HFC-125 and from 30% to 80% HFO-1234ze, and preferably from 30% to 40% HFC-32, from 8% to 20% HFC-125 and from 40% to 62% HFO-1234ze;

for composition 2): from 15% to 35% HFC-32, from 5% to 20% of HFC-125 and from 45% to 80% HFO-1234yf, and preferably from 18% to 25% HFC-32, from 8% to 20% HFC-125 and from 55% to 74% HFO-1234yf.

For a use in:

cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.), and also heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.), it has been found that the compositions that are the most efficient for replacing HFC-134a are the following:

for composition 1): from 5% to 30% of HFC-32, from 5% to 20% HFC-125 and from 50% to 90% HFO-1234ze, and preferably from 5% to 20% HFC-32, from 5% to 20% HFC-125 and from 60% to 90% HFO-1234ze.

For a use in:

cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.), and also heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.), it was found that the compositions that are the most efficient for replacing R404a or R407c are the following:

for composition 1): from 20% to 40% HFC-32, from 5% to 20% HFC-125 and from 40% to 75% HFO-1234ze, and preferably from 25% to 40% HFC-32, from 5% to 20% HFC-125 and from 40% to 70% HFO-1234ze;

for composition 2): from 15% to 35% HFC-32, from 5% to 20% HFC-125 and from 45% to 80% HFO-1234yf, and preferably from 18% to 25% HFC-32, from 8% to 20% HFC-125 and from 55% to 74% HFO-1234yf.

In the "low temperature refrigeration" processes mentioned above, the inlet temperature of the heat transfer fluid at the evaporator is preferably from −45° C. to −15° C., especially from −40° C. at −20° C. and more particularly preferably from −35° C. to −25° C., for example from −30° C.; and the temperature of the start of condensation of the heat transfer fluid at the condenser is preferably from 25° C. to 80° C., especially from 30° C. to 60° C. and more particularly preferably from 35° C. to 55° C., for example about 40° C.

In the "moderate-temperature cooling" processes mentioned above, the inlet temperature of the heat transfer fluid at the evaporator is preferably −20° C. to 10° C., especially from −15° C. to 5° C. and more particularly preferably from −10° C. to 0° C., for example about −5° C.; and the temperature of the start of condensation of the heat transfer fluid at the condenser is preferably 25° C. to 80° C., especially from 30° C. to 60° C. and more particularly preferably from 35° C. to 55° C., for example about 50° C. These processes may be refrigeration or air conditioning processes.

In the "moderate-temperature heating" processes mentioned above, the inlet temperature of the heat transfer fluid at the evaporator is preferably −20° C. to 10° C., especially from −15° C. to 5° C. and more preferably from −10° C. to 0° C., for example from −5° C., and the temperature of the start of condensation of the heat transfer fluid at the condenser is preferably 25° C. to 80° C., especially from 30° C. to 60° C. and more particularly preferably from 35° C. to 55° C., for example about 50° C.

The heat transfer fluids mentioned above are not quasi-azeotropic and are highly efficient when they are correctly coupled with a counter-current heat exchanger (with an approximately constant difference in temperature with the second fluid in the exchanger).

Each heat transfer fluid above may be mixed with one or more additives to give the heat transfer composition effectively circulating in the vapor compression circuit. The additives may be chosen especially from lubricants, stabilizers, surfactants, tracer agents, fluorescers, odorants and solubilizers, and mixtures thereof.

The stabilizer(s), when they are present, preferably represent not more than 5% by mass in the heat transfer composition. Among the stabilizers, mention may be made especially of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl or alkenyl, or aromatic) such as n-butyl glycidyl ether, hexanediol diglycidyl ether, allyl glycidyl ether, butylphenyl glycidyl ether, phosphites, phosphonates, thiols and lactones.

Lubricants that may especially be used include oils of mineral origin, silicone oils, paraffins, naphthenes, synthetic paraffins, alkylbenzenes, poly-α-olefins, polyalkylene glycols, polyol esters and/or polyvinyl ethers.

As tracer agents (capable of being detected), mention may be made of hydrofluorocarbons, deuterated hydrofluorocarbons, deuterated hydrocarbons, perfluorocarbons, fluoroethers, brominated compounds, iodinated compounds, alcohols, aldehydes, ketones and nitrous oxide, and combinations thereof. The tracer agent is different than the heat transfer compound(s) of which the heat transfer fluid is composed.

Solubilizers that may be mentioned include hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing is different than the heat transfer compound(s) of which the heat transfer fluid is composed.

Fluorescers that may be mentioned include naphthalimides, perylenes, coumarins, anthracenes, phenanthracenes, xanthenes, thioxanthenes, naphthoxanhtenes and fluoresceins, and derivatives and combinations thereof.

Odorants that may be mentioned include alkyl acrylates, allyl acrylates, acrylic acids, acryl esters, alkyl ethers, alkyl esters, alkynes, aldehydes, thiols, thioethers, disulfides, allyl-isothiocyanates, alkanoic acids, amines, norbornenes, norbornene derivatives, cyclohexene, heterocyclic aromatic compounds, ascaridol and o-methoxy(methyl)phenol, and combinations thereof.

The compositions according to the invention may also be useful as expanders, aerosol, or solvent.

EXAMPLES

The examples that follow illustrate the invention without limiting it.

Example 1

Method for Calculating the Properties of the Heat Transfer Fluids in the Various Envisioned Configurations The RK-Soave equation is used to calculate densities, enthalpies, entropies and liquid vapor equilibrium data of the mixtures. The use of this equation requires knowledge of the properties of pure substances used in the mixtures in question and also the interaction coefficients for each binary.

The data required for each pure substance are the boiling point, the critical temperature and the critical pressure, the pressure curve as a function of temperature from the boiling point up to the critical point, the saturated liquid density and the saturated vapor density as a function of the temperature.

The data for HFCs are published in ASHRAE Handbook 2005, Chapter 20, and are also available under Refrop (software developed by NIST for calculating the properties of coolant fluids).

The data of the temperature-pressure curve for the HFOs are measured by the static method. The critical temperature and the critical pressure are measured within a C80 calorimeter sold by Setaram. The densities, at saturation as a function of the temperature, are measured by the vibrating-tube densimeter teqnique developed by the laboratories of the Ecole des Mines de Paris.

The RK-Soave equation uses binary interaction coefficients to represent the behavior of the products as mixtures. The coefficients are calculated as a function of the liquid vapor equilibrium experimental data.

The technique used for the liquid vapor equilibrium measurements is the analytical static cell method. The equilibrium cell comprises a sapphire tube and is equipped with two ROLSITM electromagnetic samplers. It is immersed in a cryothermostatic bath (HUBER HS40). A field-driven magnetic stirrer rotating at variable speed is used to accelerate the arrival at equilibrium. The analysis of the samples is performed by gas chromatography (HP5890 series II) using a katharometer (TCD).

The liquid vapor equilibrium measurements on the binary HFC-32/HFO-1234ze are performed for the following isotherm: 15° C.

The liquid vapor equilibrium measurements on the binary HFC-32/HFO-1234yf are performed for the following isotherms: 70° C., 30° C., −10° C.

The liquid vapor equilibrium data for the binary HFC-32/HFC-125 are available under Refprop. Three isotherms (−30° C., 0° C. and 30° C.) are used to calculate the interaction coefficients for this binary.

The liquid vapor equilibrium measurements on the binary HFC-125/HFO-1234yf are performed for the following isothermal: −15° C., 0° C.

The liquid vapor equilibrium measurements on the binary HFC-125/HFO-1234ze are performed for the following isotherms: 25° C., 0° C.

A compression system equipped with an evaporator and counter-current condenser, a screw compressor and a pressure reducer is considered.

The system operates with 15° C. of overheating and 5° C. of undercooling. The minimum temperature difference between the secondary fluid and the coolant fluid is considered of the order of 5° C.

The isentropic yield of the compressors is a function of the compression rate. This yield is calculated according to the following equation:

$$\eta_{isen} = a - b(\tau - c)^2 - \frac{d}{\tau - e} \quad (1)$$

For a screw compressor, the constants a, b, c, d and e of equation (1) of the isentropic yeild are calculated according to the standard data published in the *Handbook of air conditioning and refrigeration*, page 11.52.

The coefficient of performance (COP) is defined as being the working power provided by the system to the power provided or consumed by the system.

The Lorenz coefficient of performance (COPLorenz) is a reference coefficient of performance. It is a function of temperatures and is used to compare the COP of different fluids.

The Lorenz coefficient of performance is defined as follows (the temperatures T are in K):

$$T_{mean}^{condenser} = T_{inlet}^{condenser} - T_{outlet}^{condenser} \quad (2)$$

$$T_{mean}^{evaporator} = T_{outlet}^{evaporator} - T_{inlet}^{evaporator} \quad (3)$$

The Lorenz COP in the case of conditioned air and of refrigeration is:

$$COPlorenz = \frac{T_{mean}^{evaporator}}{T_{mean}^{condenser} - T_{mean}^{evaporator}} \quad (4)$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

In low-temperature refrigeration mode, the compression system operates between a coolant fluid inlet temperature at the evaporator of −30° C. and a coolant fluid inlet temperature at the condenser of 40° C. The system provides cold at −25° C.

In the moderate-temperature heating mode, the compression system operates between a coolant fluid inlet temperature at the evaporator of −5° C. and a temperature of the start of condensation of the coolant fluid at the condenser of 50° C. The system provides heat at 45° C.

In moderate-temperature coolant mode, the compression system operates between a coolant fluid inlet temperature at the evaporator of −5° C. and a temperature of the start of the condensation of the coolant fluid at the condenser of 50° C. The system provides cold at 0° C.

In the tables that follow, "Evap. Leaving Temp." denotes the temperature of the fluid at the evaporator outlet, "Comp. output temp." denotes the temperature of the fluid at the compressor outlet, "Cond. output T" denotes the temperature of the fluid at the condenser outlet, "evap. P" denotes the pressure of the fluid in the evaporator, "cond. P" denotes the pressure of the fluid in the condenser, "Rate (p/p)" denotes the compression rate, "Glide" denotes the temperature glide, "comp. yield" denotes the compressor yield, "% CAP" denotes the volumetric capacity of the fluid relative to the reference fluid indicated on the first line, and "% COP/COPLorenz" denotes the ratio of the COP of the system relative to the COP of the corresponding Lorenz cycle.

Example 2

Results for Low Temperature Refrigeration, Comparison with R404a

HFC-32/HFC-125/HFO-1234ze mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| R404A | | | −30 | 100 | 40 | 2.1 | 18.1 | 8.8 | 0.46 | 53.8 | 100 | 32 |
| HFC-32 | HFC-125 | HFO-1234ze | | | | | | | | | | |
| 30 | 50 | 20 | −25 | 117 | 35 | 2.2 | 18.4 | 8.2 | 5.14 | 58.1 | 131 | 38 |
| 23 | 25 | 52 | −23 | 112 | 32 | 1.6 | 13.4 | 8.4 | 7.36 | 56.9 | 103 | 40 |
| 35 | 8 | 57 | −22 | 121 | 32 | 1.7 | 14.0 | 8.2 | 7.86 | 58.4 | 113 | 41 |
| 40 | 8 | 52 | −22 | 125 | 32 | 1.8 | 14.9 | 8.1 | 7.70 | 59.2 | 121 | 42 |
| 35 | 12 | 53 | −22 | 121 | 32 | 1.8 | 14.4 | 8.2 | 7.73 | 58.7 | 116 | 41 |
| 40 | 12 | 48 | −22 | 124 | 32 | 1.9 | 15.3 | 8.1 | 7.53 | 59.4 | 124 | 42 |
| 30 | 16 | 54 | −22 | 117 | 32 | 1.7 | 13.8 | 8.3 | 7.67 | 58.0 | 110 | 41 |
| 35 | 16 | 49 | −22 | 120 | 32 | 1.8 | 14.7 | 8.1 | 7.58 | 59.0 | 118 | 41 |
| 40 | 16 | 44 | −23 | 124 | 32 | 1.9 | 15.7 | 8.1 | 7.32 | 59.6 | 126 | 42 |
| 30 | 20 | 50 | −22 | 117 | 32 | 1.7 | 14.2 | 8.2 | 7.56 | 58.4 | 113 | 41 |
| 35 | 20 | 45 | −23 | 120 | 32 | 1.9 | 15.2 | 8.1 | 7.41 | 59.3 | 121 | 41 |
| 40 | 20 | 40 | −23 | 124 | 33 | 2.0 | 16.1 | 8.1 | 7.08 | 59.6 | 129 | 41 |

In the preceding table, as in the following tables, the grayed lines correspond to the compositions disclosed in U.S. 2009/0250650 or WO 2010/002014 and the following lines correspond to the compositions according to the invention.

HFC-32/HFC-125/HFO-1234yf mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| R404A | | | −30 | 100 | 40 | 2.1 | 18.1 | 8.8 | 0.46 | 53.8 | 100 | 32 |
| HFO-1234yf | HFC-32 | HFC-125 | | | | | | | | | | |
| 25 | 25 | 50 | −28 | 114 | 37 | 2.3 | 19.7 | 8.6 | 2.39 | 55.7 | 125 | 35 |
| 60 | 15 | 25 | −26 | 98 | 34 | 1.7 | 14.7 | 8.5 | 3.84 | 56.5 | 99 | 37 |
| 72 | 20 | 8 | −25 | 100 | 33 | 1.7 | 14.4 | 8.3 | 4.63 | 58.1 | 102 | 39 |
| 70 | 22 | 8 | −25 | 101 | 33 | 1.8 | 14.8 | 8.2 | 4.73 | 58.5 | 106 | 39 |
| 67 | 25 | 8 | −25 | 103 | 33 | 1.9 | 15.4 | 8.1 | 4.79 | 59.0 | 111 | 39 |
| 62 | 30 | 8 | −25 | 108 | 34 | 2.0 | 16.5 | 8.1 | 4.68 | 59.2 | 119 | 39 |
| 70 | 18 | 12 | −26 | 99 | 33 | 1.7 | 14.3 | 8.3 | 4.37 | 57.4 | 100 | 38 |
| 68 | 20 | 12 | −25 | 100 | 33 | 1.8 | 14.7 | 8.3 | 4.50 | 58.0 | 104 | 38 |
| 66 | 22 | 12 | −25 | 102 | 33 | 1.8 | 15.1 | 8.2 | 4.58 | 58.3 | 107 | 39 |
| 63 | 25 | 12 | −25 | 104 | 33 | 1.9 | 15.8 | 8.2 | 4.61 | 58.7 | 113 | 39 |
| 66 | 18 | 16 | −26 | 99 | 33 | 1.8 | 14.6 | 8.3 | 4.27 | 57.4 | 101 | 38 |
| 64 | 20 | 16 | −26 | 101 | 33 | 1.8 | 15.0 | 8.3 | 4.37 | 57.8 | 105 | 38 |
| 62 | 22 | 16 | −26 | 102 | 33 | 1.9 | 15.5 | 8.2 | 4.43 | 58.2 | 109 | 38 |
| 59 | 25 | 16 | −26 | 105 | 34 | 2.0 | 16.1 | 8.2 | 4.43 | 58.4 | 114 | 39 |
| 62 | 18 | 20 | −26 | 100 | 33 | 1.8 | 15.0 | 8.4 | 4.16 | 57.3 | 103 | 38 |
| 60 | 20 | 20 | −26 | 101 | 33 | 1.9 | 15.4 | 8.3 | 4.24 | 57.7 | 107 | 38 |
| 58 | 22 | 20 | −26 | 103 | 34 | 1.9 | 15.8 | 8.3 | 4.27 | 58.0 | 110 | 38 |
| 55 | 25 | 20 | −26 | 106 | 34 | 2.0 | 16.5 | 8.2 | 4.24 | 58.2 | 115 | 38 |

Example 3

Results for Moderate-Temperature Cooling, Comparison with HFC-134a

HFC-32/HFC-125/HFO-1234ze mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| HFC-32 | HFC-125 | HFO-1234ze | | | | | | | | | | |
| R134a | | | −5 | 81 | 50 | 2.4 | 13.2 | 5.4 | 0.00 | 75.9 | 100 | 54 |
| 5 | 15 | 80 | −1 | 74 | 44 | 2.5 | 12.2 | 4.8 | 4.02 | 78.5 | 106 | 56 |

-continued

| \multicolumn{3}{c}{Composition (%) R134a} | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|
| HFC-32 | HFC-125 | HFO-1234ze | | | | | | | | | |
| 5 | 18 | 77 | −1 | 74 | 44 | 2.6 | 12.4 | 4.7 | 4.27 | 78.7 | 109 | 56 |
| 5 | 20 | 75 | −1 | 74 | 44 | 2.7 | 12.6 | 4.7 | 4.42 | 78.8 | 111 | 56 |
| 10 | 5 | 85 | 0 | 76 | 43 | 2.7 | 12.5 | 4.6 | 5.10 | 79.1 | 116 | 58 |
| 10 | 15 | 75 | 1 | 77 | 43 | 2.9 | 13.3 | 4.5 | 5.52 | 79.5 | 124 | 57 |
| 10 | 18 | 72 | 1 | 77 | 43 | 3.0 | 13.6 | 4.5 | 5.64 | 79.6 | 127 | 57 |
| 10 | 20 | 70 | 1 | 76 | 43 | 3.1 | 13.7 | 4.5 | 5.72 | 79.6 | 128 | 57 |
| 15 | 5 | 80 | 1 | 79 | 42 | 3.1 | 13.5 | 4.4 | 6.32 | 79.8 | 132 | 58 |
| 15 | 15 | 70 | 1 | 79 | 42 | 3.3 | 14.4 | 4.3 | 6.43 | 80.0 | 139 | 58 |
| 15 | 18 | 67 | 1 | 79 | 42 | 3.4 | 14.7 | 4.3 | 6.47 | 80.1 | 142 | 58 |
| 15 | 20 | 65 | 2 | 79 | 42 | 3.5 | 14.9 | 4.3 | 6.50 | 80.1 | 144 | 58 |
| 20 | 5 | 75 | 2 | 81 | 42 | 3.4 | 14.6 | 4.3 | 7.01 | 80.2 | 146 | 59 |
| 20 | 15 | 65 | 2 | 81 | 42 | 3.7 | 15.5 | 4.2 | 6.95 | 80.4 | 154 | 58 |

Example 4

Results for Moderate-Temperature Heating, Comparison with HFC-134a

HFC-32/HFC-125/HFO-1234ze mixture:

| \multicolumn{3}{c}{Composition (%) R134a} | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|
| HFC-32 | HFC-125 | HFO-1234ze | | | | | | | | | |
| | | | −5 | 81 | 50 | 2.4 | 13.2 | 5.4 | 0.00 | 75.9 | 100 | 63 |
| 5 | 15 | 80 | −1 | 74 | 44 | 2.5 | 12.2 | 4.8 | 4.02 | 78.5 | 103 | 65 |
| 5 | 18 | 77 | −1 | 74 | 44 | 2.6 | 12.4 | 4.7 | 4.27 | 78.7 | 106 | 65 |
| 5 | 20 | 75 | −1 | 74 | 44 | 2.7 | 12.6 | 4.7 | 4.42 | 78.8 | 108 | 65 |
| 10 | 5 | 85 | 0 | 76 | 43 | 2.7 | 12.5 | 4.6 | 5.10 | 79.1 | 110 | 66 |
| 10 | 15 | 75 | 1 | 77 | 43 | 2.9 | 13.3 | 4.5 | 5.52 | 79.5 | 118 | 66 |
| 10 | 18 | 72 | 1 | 77 | 43 | 3.0 | 13.6 | 4.5 | 5.64 | 79.6 | 121 | 66 |
| 10 | 20 | 70 | 1 | 76 | 43 | 3.1 | 13.7 | 4.5 | 5.72 | 79.6 | 123 | 66 |
| 15 | 5 | 80 | 1 | 79 | 42 | 3.1 | 13.5 | 4.4 | 6.32 | 79.8 | 124 | 66 |
| 15 | 15 | 70 | 1 | 79 | 42 | 3.3 | 14.4 | 4.3 | 6.43 | 80.0 | 132 | 66 |
| 15 | 18 | 67 | 1 | 79 | 42 | 3.4 | 14.7 | 4.3 | 6.47 | 80.1 | 135 | 66 |
| 15 | 20 | 65 | 2 | 79 | 42 | 3.5 | 14.9 | 4.3 | 6.50 | 80.1 | 136 | 66 |
| 20 | 5 | 75 | 2 | 81 | 42 | 3.4 | 14.6 | 4.3 | 7.01 | 80.2 | 137 | 66 |
| 20 | 15 | 65 | 2 | 81 | 42 | 3.7 | 15.5 | 4.2 | 6.95 | 80.4 | 145 | 66 |

Example 5

Results for Moderate-Temperature Cooling, Comparison with R404a and R407c

HFC-32/HFC-125/HFO-1234ze mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| \multicolumn{3}{l}{R404A} | −5 | 77 | 50 | 5.2 | 23.0 | 4.5 | 0.37 | 79.7 | 100 | 48 |
| \multicolumn{3}{l}{R407C} | −1 | 89 | 45 | 4.5 | 19.8 | 4.4 | 4.46 | 79.9 | 114 | 56 |
| HFC-32 | HFC-125 | HFO-1234ze | | | | | | | | | | |
| 30 | 50 | 20 | 0 | 89 | 45 | 5.7 | 23.6 | 4.2 | 4.88 | 80.5 | 133 | 54 |
| 23 | 25 | 52 | 2 | 83 | 42 | 4.2 | 17.3 | 4.1 | 7.04 | 80.6 | 109 | 58 |
| 25 | 5 | 70 | 2 | 84 | 42 | 3.8 | 15.7 | 4.2 | 7.38 | 80.5 | 102 | 59 |
| 25 | 15 | 60 | 2 | 84 | 42 | 4.0 | 16.7 | 4.1 | 7.23 | 80.6 | 107 | 59 |
| 30 | 5 | 65 | 3 | 87 | 42 | 4.1 | 16.8 | 4.1 | 7.54 | 80.7 | 110 | 59 |
| 40 | 5 | 55 | 2 | 92 | 42 | 4.7 | 18.9 | 4.0 | 7.45 | 80.9 | 124 | 59 |
| 40 | 15 | 45 | 2 | 92 | 43 | 5.0 | 20.1 | 4.0 | 7.04 | 80.9 | 129 | 58 |
| 40 | 18 | 42 | 2 | 92 | 43 | 5.1 | 20.5 | 4.0 | 6.88 | 80.9 | 131 | 58 |
| 40 | 20 | 40 | 2 | 92 | 43 | 5.2 | 20.8 | 4.0 | 6.77 | 80.9 | 132 | 58 |

Example 6

Results for Moderate-Temperature Cooling, Comparison with R404a

HFC-32/HFC-125/HFO-1234yf mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| HFO-1234yf | HFC-32 | HFC-125 | | | | | | | | | | |
| 52 | 23 | 25 | −1 | 82 | 45 | 5.1 | 21.1 | 4.1 | 4.32 | 80.6 | 117 | 54 |
| 60 | 15 | 25 | −1 | 76 | 44 | 4.5 | 18.8 | 4.2 | 4.23 | 80.5 | 104 | 54 |
| 74 | 18 | 8 | 0 | 77 | 43 | 4.4 | 17.9 | 4.1 | 4.97 | 80.7 | 104 | 56 |
| 72 | 20 | 8 | 0 | 78 | 43 | 4.5 | 18.5 | 4.1 | 5.11 | 80.8 | 107 | 56 |
| 70 | 22 | 8 | 0 | 79 | 43 | 4.7 | 19.0 | 4.1 | 5.18 | 80.8 | 111 | 56 |
| 67 | 25 | 8 | 0 | 81 | 43 | 4.9 | 19.8 | 4.0 | 5.18 | 80.8 | 115 | 56 |
| 62 | 30 | 8 | 0 | 84 | 44 | 5.2 | 21.1 | 4.1 | 4.97 | 80.8 | 122 | 55 |
| 70 | 18 | 12 | 0 | 77 | 43 | 4.5 | 18.3 | 4.1 | 4.84 | 80.7 | 105 | 55 |
| 68 | 20 | 12 | 0 | 78 | 43 | 4.6 | 18.8 | 4.1 | 4.95 | 80.7 | 108 | 55 |
| 66 | 22 | 12 | 0 | 80 | 43 | 4.8 | 19.4 | 4.1 | 4.99 | 80.8 | 112 | 55 |
| 63 | 25 | 12 | 0 | 81 | 44 | 5.0 | 20.2 | 4.1 | 4.97 | 80.8 | 116 | 55 |
| 58 | 30 | 12 | 0 | 85 | 44 | 5.3 | 21.5 | 4.1 | 4.72 | 80.7 | 123 | 55 |
| 69 | 15 | 16 | −1 | 76 | 43 | 4.3 | 17.9 | 4.2 | 4.47 | 80.6 | 100 | 55 |
| 66 | 18 | 16 | 0 | 77 | 43 | 4.5 | 18.7 | 4.1 | 4.70 | 80.7 | 106 | 55 |
| 64 | 20 | 16 | 0 | 79 | 44 | 4.7 | 19.3 | 4.1 | 4.78 | 80.7 | 109 | 55 |
| 62 | 22 | 16 | 0 | 80 | 44 | 4.8 | 19.8 | 4.1 | 4.80 | 80.7 | 113 | 55 |
| 59 | 25 | 16 | 0 | 82 | 44 | 5.0 | 20.6 | 4.1 | 4.75 | 80.7 | 117 | 55 |
| 65 | 15 | 20 | −1 | 76 | 44 | 4.4 | 18.3 | 4.2 | 4.37 | 80.5 | 102 | 55 |
| 60 | 20 | 20 | 0 | 79 | 44 | 4.8 | 19.7 | 4.1 | 4.61 | 80.6 | 111 | 55 |
| 58 | 22 | 20 | 0 | 80 | 44 | 4.9 | 20.3 | 4.1 | 4.61 | 80.7 | 114 | 55 |

Example 7

Results for Moderate-Temperature Heating, Comparison with R404a

HFC-32/HFC-125/HFO-1234yf mixture:

| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| HFO-1234yf | HFC-32 | HFC-125 | | | | | | | | | | |
| 52 | 23 | 25 | −1 | 82 | 45 | 5.1 | 21.1 | 4.1 | 4.32 | 80.6 | 110 | 63 |
| 60 | 15 | 25 | −1 | 76 | 44 | 4.5 | 18.8 | 4.2 | 4.23 | 80.5 | 98 | 63 |
| 72 | 20 | 8 | 0 | 78 | 43 | 4.5 | 18.5 | 4.1 | 5.11 | 80.8 | 100 | 64 |
| 70 | 22 | 8 | 0 | 79 | 43 | 4.7 | 19.0 | 4.1 | 5.18 | 80.8 | 103 | 64 |
| 67 | 25 | 8 | 0 | 81 | 43 | 4.9 | 19.8 | 4.0 | 5.18 | 80.8 | 108 | 64 |
| 68 | 20 | 12 | 0 | 78 | 43 | 4.6 | 18.8 | 4.1 | 4.95 | 80.7 | 102 | 64 |
| 66 | 22 | 12 | 0 | 80 | 43 | 4.8 | 19.4 | 4.1 | 4.99 | 80.8 | 105 | 64 |
| 66 | 18 | 16 | 0 | 77 | 43 | 4.5 | 18.7 | 4.1 | 4.70 | 80.7 | 100 | 64 |

The invention claimed is:

1. A ternary composition comprising difluoromethane pentafluoroethane, and tetrafluoropropene, wherein the composition comprises a combination selected from the group consisting of, in mass percent:
   from 18% to 25% of difluoromethane, from 8% to 20% of pentafluoroethane, and from 55% to 74% of 2,3,3,3-tetrafluoropropene;
   from 30% to 40% of difluoromethane, from 8% to 20% of pentafluoroethane, and from 40% to 62% of 1,3,3-tetrafluoropropene;
   from 5% to 20% of difluoro e hane, from 5% to 20% of pentafluoroethane, and from 60% to 90% of 1,3,3,3-tetrafluoropropene; and
   from 25% to 40% of difluoromethane, from 5% to 20% of pentafluoroethane, and from 40% to 70% of 1,3,3,3-tetrafluoropropene.

2. The composition as claimed in claim 1, in which the tetrafluoropropene is 1,3,3,3-tetrafluoropropene.

3. The composition as claimed in claim 1, in which the tetrafluoropropene is 2,3,3,3-tetrafluoropropene.

4. A vapor compression circuit comprising a composition as claimed in claim 1.

5. A heat-transfer composition comprising the composition as claimed in claim 1 further comprising one or more additives selected from the group consisting of lubricants, stabilizers, surfactants, tracer agents, fluorescent agents, odorants and solubilizing agents, and mixtures thereof.

6. A heat transfer installation comprising a vapor compression circuit containing a composition as claimed in claim 1 as a heat transfer fluid.

7. A process for heating or cooling a fluid or a body using a vapor compression circuit containing a heat transfer fluid, said process successively comprising evaporation of the heat transfer fluid, compression of the heat transfer fluid, condensation of the heat fluid and depressurization of the heat transfer fluid, in which the heat transfer fluid is a composition as claimed in claim 1.

8. The process as claimed in claim 7, which is a process for cooling a fluid or a body, in which the temperature of the cooled fluid or body is from −40° C. to −10° C., in which the heat transfer fluid comprises a combination selected from the group consisting of in mass percent:
from 18% to 25% of difluoromethane, from 8% to 20% of pentafluoroethane and from 55% to 74% of 2,3,3,3-tetrafluoropropene; and
from 30% to 40% of difluoromethane, from 8% to 20% of pentafluoroethane and from 40% to 62% of 1,3,3,3-tetrafluoropropene.

9. The process as claimed in claim 7, which is a process for cooling a fluid or a body, in which the temperature of the cooled fluid or body is from −15° C. to 15° C., in which the heat transfer fluid comprises a combination selected from the group consisting of, in mass percent:
from 18% to 25% of difluoromethane, from 8% to 20% of pentafluoroethane and from 55% to 74% of 2,3,3,3-tetrafluoropropene;
from 5% to 20% of difluoromethane, from 5% to 20% of pentafluoroethane and from 60% to 90% of 1,3,3,3-tetrafluoropropene; and
from 25% to 40% of difluoromethane, from 5% to 20% of pentafluoroethane and from 40% to 70% of 1,3,3,3-tetrafluoropropene.

10. The process as claimed in claim 7, which is a process for heating a fluid or a body, in which the temperature of the heated fluid or body is from 30° C. to 80° C., in which the heat transfer fluid comprises a combination selected from the group consisting of, in mass percent:
from 18% to 25% of difluoromethane, from 8% to 20% of pentafluoroethane and from 55% to 74% of 2,3,3,3-tetrafluoropropene;
from 5% to 20% of difluoromethane, from 5% to 20% of pentafluoroethane and from 60% to 90% of 1,3,3,3-tetrafluoropropene; and
from 25% to 40% of difluoromethane, from 5% to 20% of pentafluoroethane and from 40% to 70% of 1,3,3,3-tetrafluoropropene.

11. A process for reducing the environmental impact of a heat transfer installation comprising a vapor compression circuit containing an initial heat transfer fluid, said process comprising a step of replacing the initial heat transfer fluid in the vapor compression circuit with a final transfer fluid, the final transfer fluid having a lower GWP than the initial heat transfer fluid, in which the final heat transfer fluid is a composition as claimed in claim 1.

12. The process as claimed in claim 11, in which the initial heat transfer fluid is a ternary mixture of 52% of 1,1,1-trifluoroethane, 44% of pentafluoroethane and 4% of 1,1,1,2-tetrafluoroethane or a ternary mixture of 52% of 1,1,1,2-tetrafluoroethane, 25% of pentafluoroethane and 23% of difluoromethane, and in which the final heat transfer fluid comprises a combination selected from the group consisting of, in mass percent:
from 18% to 25% of difluoromethane, from 8% to 20% of pentafluoroethane and from 55% to 74% of 2,3,3,3-tetrafluoropropene;
from 30% to 40% of difluoromethane, from 8% to 20% of pentafluoroethane and from 40% to 62% of 1,3,3,3-tetrafluoropropene; and
from 25% to 40% of difluoromethane, from 5% to 20% of pentafluoroethane and from 40% to 70% of 1,3,3,3-tetrafluoropropene.

13. A process for reducing the environmental impact of a heat transfer installation comprising a vapor compression circuit containing an initial heat transfer fluid, said process comprising a step of replacing the initial heat transfer fluid in the vapor compression circuit with a final transfer fluid, the final transfer fluid having a lower GWP than the initial heat transfer fluid, in which the initial heat transfer fluid is 1,1,1,2-tetrafluoroethane, and in which the final heat transfer fluid comprises, in mass percent:
from 5% to 30% of difluoromethane, from 5% to 20% of pentafluoroethane and from 50% to 90% of 1,3,3,3-tetrafluoropropene.

14. A ternary composition consisting of, in mass percent:
from 18% to 25% of difluoromethane;
from 8% to 20% of pentafluoroethane;
from 55% to 68% of 2,3,3,3-tetrafluoropropene; and
optionally, one or more additives selected from the group consisting of lubricants, stabilizers, surfactants, tracer agents, fluorescent agents, odorants and solubilizing agents, and mixtures thereof.

* * * * *